United States Patent
Kawamura

(10) Patent No.: US 10,622,930 B2
(45) Date of Patent: Apr. 14, 2020

(54) MOTOR CONTROL DEVICE AND CONTROL METHOD

(71) Applicant: NISSAN MOTOR CO., LTD., Yokohama-shi, Kanagawa (JP)

(72) Inventor: Hiromichi Kawamura, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/305,483

(22) PCT Filed: Jun. 21, 2016

(86) PCT No.: PCT/JP2016/068365
§ 371 (c)(1),
(2) Date: Nov. 29, 2018

(87) PCT Pub. No.: WO2017/221320
PCT Pub. Date: Dec. 28, 2017

(65) Prior Publication Data
US 2019/0341868 A1    Nov. 7, 2019

(51) Int. Cl.
*H02P 27/02* (2016.01)
*H02P 21/20* (2016.01)
(Continued)

(52) U.S. Cl.
CPC .............. *H02P 27/02* (2013.01); *H02P 21/06* (2013.01); *H02P 21/20* (2016.02); *H02P 23/0027* (2013.01)

(58) Field of Classification Search
CPC ...... H02P 1/00; H02P 1/04; H02P 1/46; H02P 3/00; H02P 3/18; H02P 5/00; H02P 6/00; H02P 6/14; H02P 23/00; H02P 21/00; H02P 27/00; H02P 27/04; H02P 27/06; G05B 11/28
(Continued)

(56) References Cited

U.S. PATENT DOCUMENTS 8,558,500 B2 * 10/2013 Yamakawa ......... H02P 21/0021
                                                 318/805
9,178,458 B2 * 11/2015 Yamazaki ........... H02P 21/0003
(Continued)

FOREIGN PATENT DOCUMENTS

JP      H10-337093 A    12/1998
JP      2010-88241 A     4/2010
(Continued)

*Primary Examiner* — Antony M Paul
(74) *Attorney, Agent, or Firm* — Faegre Drinker Biddle & Reath LLP

(57) ABSTRACT

A motor control method of the present invention is a motor control method for controlling, by a voltage phase control, an applied voltage applied to a motor via an inverter. The control method includes: calculating a phase command value to be used for the voltage phase control by a feedforward control based on a torque command value to the motor; calculating an amplitude command value to be used for the voltage phase control, based on a drive voltage for the inverter; calculating a voltage command value to the motor based on the phase command value and the amplitude command value; and a voltage application step of applying the applied voltage from the inverter to the motor based on the voltage command value.

4 Claims, 7 Drawing Sheets

(51) Int. Cl.
*H02P 21/06* (2016.01)
*H02P 23/00* (2016.01)

(58) Field of Classification Search
USPC .... 318/400.01, 400.02, 400.14, 400.15, 700,
318/701, 721, 779, 799, 800, 801, 430,
318/432; 363/40, 44, 95, 120, 174, 175;
361/23, 30
See application file for complete search history.

(56) References Cited

U.S. PATENT DOCUMENTS

2011/0248663 A1* 10/2011 Yamakawa ......... H02P 21/0021
318/805
2014/0125261 A1* 5/2014 Yamazaki ........... H02P 21/0003
318/400.02

FOREIGN PATENT DOCUMENTS

| JP | 2010-148331 A | 7/2010 |
| JP | 2013-137129 A | 7/2013 |
| WO | WO-2015/005016 A1 | 1/2015 |

* cited by examiner

MOTOR CONTROL DEVICE AND CONTROL METHOD

TECHNICAL FIELD

The present invention relates to a motor control device and a control method.

BACKGROUND ART

A voltage phase control method is known as one of control methods for a motor and the like. In the voltage phase control method, a phase command value is calculated based on a torque command value and an amplitude command value is calculated by use of a predetermined modulation rate. A voltage corresponding to the phase command value and the amplitude command value is applied to the motor. Generally, in such a voltage phase control method, in order to improve accuracy of a rotation control on the motor, a feedback control is performed on the phase command value. More specifically, a torque estimated value is found from a current flowing into the motor, and the phase command value is controlled so that a deviation between the torque command value and the torque estimated value is reduced. (JP 2013-137129 A)

SUMMARY OF INVENTION

In the feedback control, a current flowing into the motor is measured first, and the phase command value is controlled based on the measured current. Such a feedback control is based on a measured value of the current, so the responsiveness is not sufficiently high. For example, when a noise occurs in the current flowing into the motor, the noise is not reduced but amplified, so that a rotation control might become unstable.

An object of the present invention is to stably perform a rotation control on a motor.

According to one embodiment of the present invention, a motor control method of the present invention is a motor control method for controlling, by a voltage phase control, an applied voltage applied to a motor via an inverter. The control method includes: a phase command value calculation step of calculating a phase command value to be used for the voltage phase control by a feedforward control based on a torque command value to the motor; an amplitude command value calculation step of calculating an amplitude command value to be used for the voltage phase control, based on a drive voltage for the inverter; a voltage command value calculation step of calculating a voltage command value to the motor based on the phase command value and the amplitude command value; and a voltage application step of applying the applied voltage from the inverter to the motor based on the voltage command value.

DESCRIPTION OF EMBODIMENTS

With reference to the attached drawings, the following describes embodiments of the present invention.

First Embodiment

Figure 1:
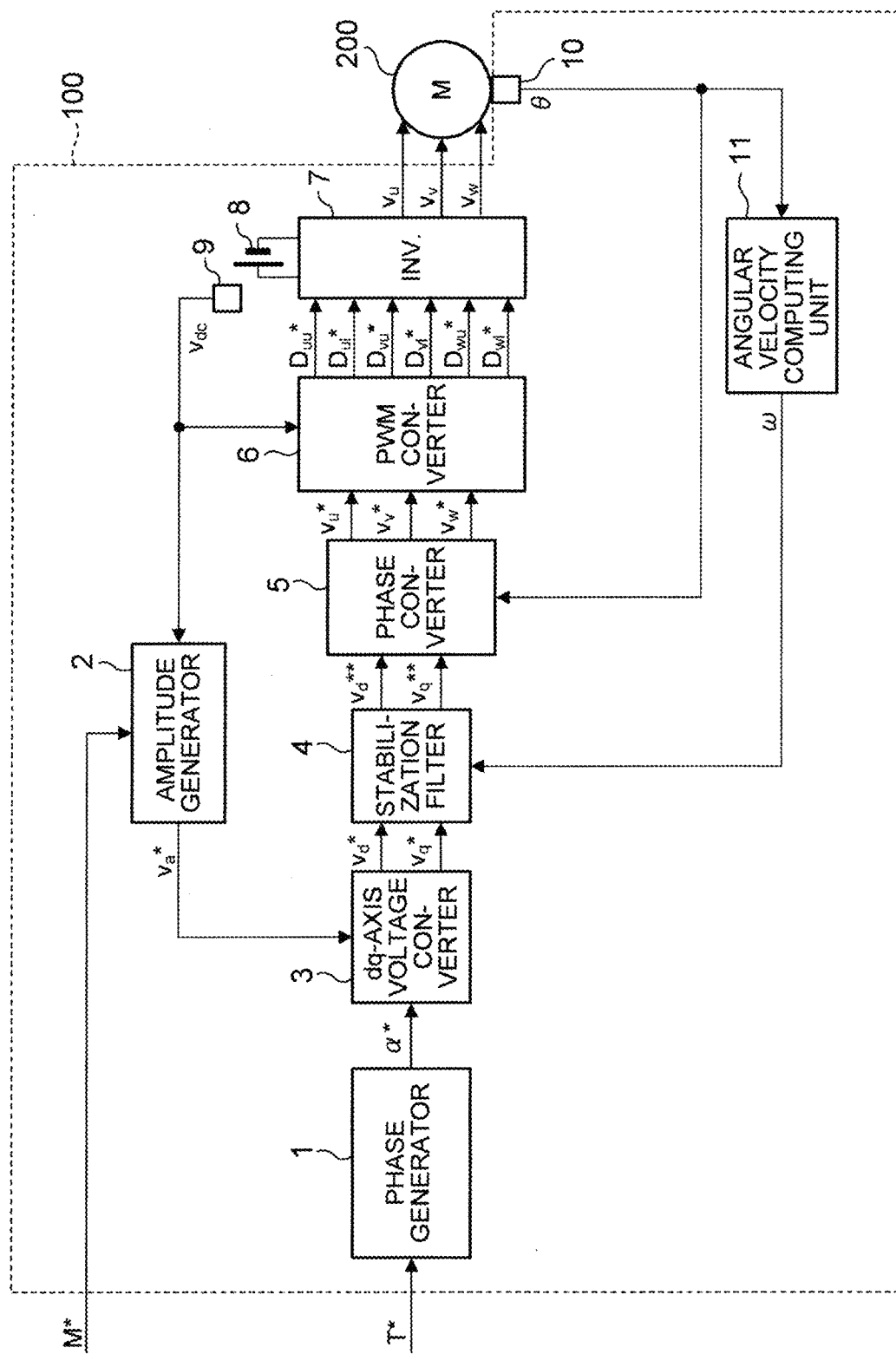
FIG. 1 is a block diagram of a motor control device in the first embodiment.

FIG. 1 is a block diagram of a motor control device in the first embodiment.

A control device 100 applies three-phase voltages $v_u$, $v_v$, $v_w$ to a motor 200 based on input of a modulation rate command value M* and a torque command value T*. The modulation rate command value M* is a value determined by a structure or the like of the motor 200, and a predetermined value such as "1.0" is used, for example. Further, the torque command value T* changes in accordance with an accelerator opening degree and the like.

The control device 100 includes a phase generator 1, an amplitude generator 2, a dq-axis voltage converter 3, a stabilization filter 4, a phase converter 5, a PWM converter 6, an inverter 7, a battery 8, a voltage sensor 9, a rotation sensor 10, and an angular velocity computing unit 11. Further, the position of a rotor of the motor 200 is detected by the rotation sensor 10.

The phase generator 1 calculates a phase command value α* to be used for a voltage phase control by a feedforward control based on the torque command value T* input from the outside of the control device 100, and outputs the calculated phase command value α* to the dq-axis voltage converter 3. More specifically, the phase generator 1 has a table stored therein and calculates the phase command value α* by use of the table. The feedforward control is performed based on a transfer function that models the voltage phase control of the motor 200, and the like. Note that the phase generator 1 is one example of a phase command value calculating portion that executes a phase command value calculation step.

The modulation rate command value M* is input into the amplitude generator 2 from the outside of the control device 100 and a direct voltage $v_{dc}$ of the battery 8, measured by the voltage sensor 9, is also input therein. Note that the battery 8 supplies, to the inverter 7, the direct voltage $v_{dc}$ as a drive voltage. The amplitude generator 2 calculates an amplitude command value $v_a^*$ based on these inputs, and outputs the calculated amplitude command value $v_a^*$ to the dq-axis voltage converter 3. More specifically, the calculation of the amplitude command value $v_a^*$ is performed by use of the following equation. Note that the amplitude generator 2 is one example of an amplitude command value calculating portion that executes an amplitude command value calculation step.

Math. 1

$$v_a^* = \frac{v_{dc}}{\sqrt{2}} \times M^* \qquad (1)$$

The dq-axis voltage converter 3 calculates a d-axis voltage command value $v_d^*$ and a q-axis voltage command value $v_q^*$ by use of the phase command value α* and the amplitude command value $v_a^*$ based on the following equation. The dq-axis voltage converter 3 then outputs the d-axis voltage command value $v_d^*$ and the q-axis voltage command value $v_q^*$ to the stabilization filter 4.

Math. 2

$$\begin{cases} v_d^* = -v_a^* \sin\alpha^* \\ v_q^* = v_a^* \cos\alpha^* \end{cases} \quad (2)$$

The stabilization filter 4 is a filter that reduces vibrations of the current flowing into the motor 200 in a resonance frequency band by use of a well-known technique. The stabilization filter 4 performs filtering on the d-axis voltage command value $v_d^*$ and the q-axis voltage command value $v_q^*$ based on a rotation speed ω of the motor 200 output from the angular velocity computing unit 11. More specifically, the stabilization filter 4 performs filtering so as to transiently restrain changes of the amplitude and the phase and calculates a final d-axis voltage command value $v_d^{}$ and a final q-axis voltage command value $v_q^{}$. The stabilization filter 4 then outputs the final d-axis voltage command value $v_d^{}$ and the final q-axis voltage command value $v_q^{}$ to the phase converter 5. Note that, in a case where frequencies of the d-axis voltage command value $v_d^*$ and the q-axis voltage command value $v_q^*$ are sufficiently small as compared to a resonance frequency of the current flowing into the motor 200, there is little risk that the current flowing into the motor 200 resonates, so that the stabilization filter 4 may not be provided.

The phase converter 5 performs phase conversion from dq axes to uvw phases on the final d-axis voltage command value $v_d^{}$ and the final q-axis voltage command value $v_q^{}$ based on a rotor phase θ output from the rotation sensor 10. More specifically, the phase converter 5 performs phase conversion based on the following equation so as to calculate three-phase voltage command values $v_u^*$, $v_v^*$, $v_w^*$. Then, the phase converter 5 outputs the three-phase voltage command values $v_u^*$, $v_v^*$, $v_w^*$ to the PWM converter 6.

Math. 3

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_d^{} \\ v_q^{} \end{bmatrix} \quad (3)$$

The PWM converter 6 performs well-known dead time compensation processing, voltage utilization factor improvement processing, and the like based on the three-phase voltage command values $v_u^*$, $v_v^*$, $v_w^*$ and the direct voltage $v_{dc}$, so as to generate driving signals $D_{uu}^*$, $D_{ul}^*$, $D_{vu}^*$, $D_{vl}^*$, $D_{wu}^*$, $D_{wl}^*$. Note that the driving signals $D_{uu}^*$, $D_{ul}^*$, $D_{vu}^*$, $D_{vl}^*$, $D_{wu}^*$, $D_{wl}^*$ are input into respective switching elements of the inverter 7 constituted by three-phase six arms.

The inverter 7 drives the switching elements based on the driving signals $D_{uu}^*$, $D_{ul}^*$, $D_{vu}^*$, $D_{vl}^*$, $D_{wu}^*$, $D_{wl}^*$ by use of the direct voltage $v_{dc}$ supplied from the battery 8 and generates three-phase voltages $v_u$, $v_v$, $v_w$ that are pseudo AC voltages. The inverter 7 applies the three-phase voltages $v_u$, $v_v$, $v_w$ to the motor 200. In other words, the three-phase voltages $v_u$, $v_v$, $v_w$ are applied voltages to the motor 200.

With such a configuration, the rotational drive of motor 200 is controlled by the voltage phase control based on the phase command value α* and the amplitude command value $v_a^*$.

With the first embodiment, it is possible to yield the following effects.

In the control method of the first embodiment, the phase generator 1 executes a feedforward step and calculates a phase command value α*. The amplitude generator 2 executes an amplitude calculation step and calculates an amplitude command value $v_a^*$. The dq-axis voltage converter 3, the stabilization filter 4, and the phase converter 5 are an example of a voltage command value calculating portion. The voltage command value calculating portion executes a voltage command value calculation step based on input of the phase command value α* and the amplitude command value $v_a^*$ and calculates three-phase voltage command values $v_u^*$, $v_v^*$, $v_w^*$. The PWM converter 6 is one example of a voltage application portion and applies three-phase voltages $v_u$, $v_v$, $v_w$ corresponding to the three-phase voltage command values $v_u^*$, $v_v^*$, $v_w^*$ to the motor 200 as applied voltages via the inverter 7.

In a feedback control, a control based on a detection value of a current flowing into the motor 200 is performed. On this account, in comparison with a feedforward control that does not use the detection value, the responsiveness of the feedback control is low. Accordingly, by performing only the feedforward control, the responsiveness can be made higher than a case where the feedback control is performed. Consequently, even when a noise occurs in the current flowing into the motor 200, for example, the noise is reduced before the noise is amplified, thereby making it possible to improve stability of the motor 200.

Second Embodiment

The first embodiment deals with an example in which the phase generator 1 calculates the phase command value α* based on the torque command value T*. The second embodiment deals with an example in which the phase generator 1 calculates the phase command value α* further based on the amplitude command value $v_a^*$ and the rotation speed ω.

Figure 2:
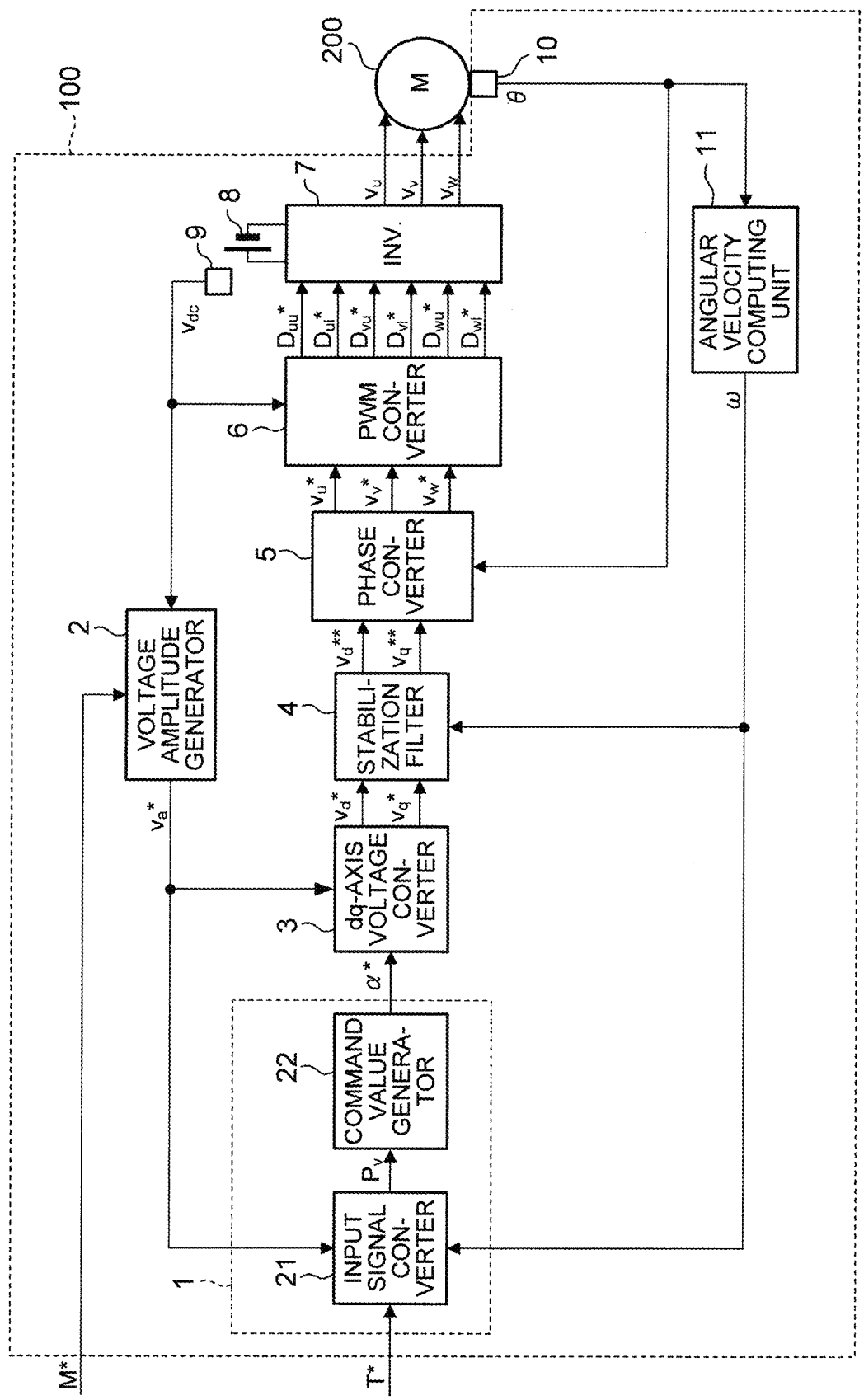
FIG. 2 is a block diagram of a motor control device in the second embodiment.

FIG. 2 is a block diagram of a motor control device in the second embodiment.

The phase generator 1 is constituted by an input signal converter 21 and a command value generator 22.

In addition to the torque command value T*, the amplitude command value $v_a^*$ output from the amplitude generator 2 and the rotation speed ω output from the angular velocity computing unit 11 are input into the input signal converter 21. The input signal converter 21 calculates a first signal Pv based on these input values in accordance with the following equation. The input signal converter 21 outputs the calculated first signal Pv to the command value generator 22.

Math. 4

$$P_v = \frac{\omega T^*}{v_a^*} \quad (4)$$

The command value generator 22 calculates a phase command value α* corresponding to the first signal Pv by referring to a table stored in advance. Note that one example of a relationship between the first signal Pv and the phase command value α*, set in the table, is illustrated in FIG. 4.

Figure 3:
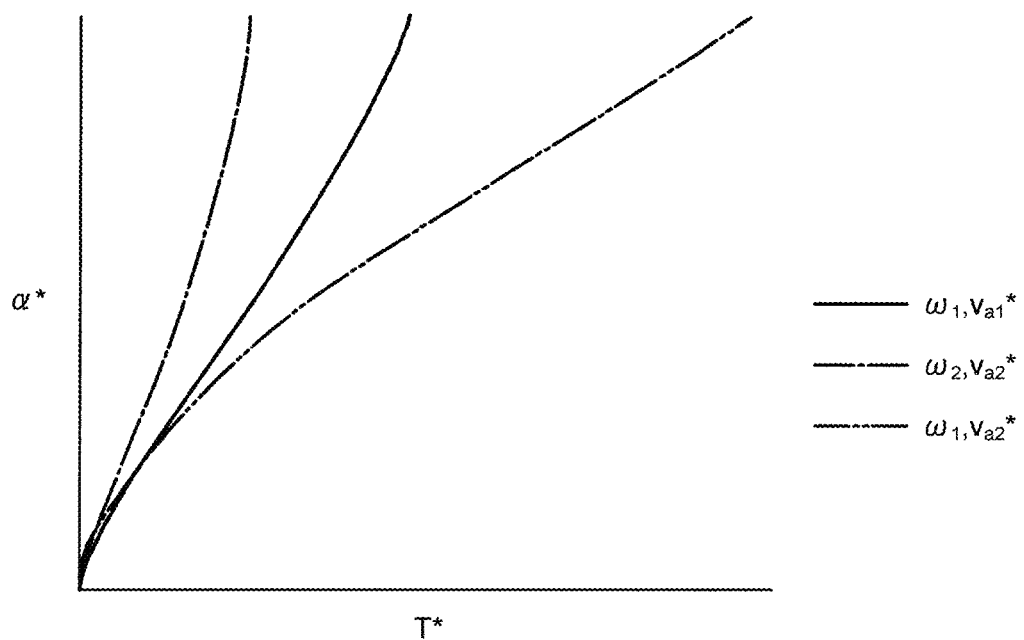
FIG. 3 is a view illustrating a correlation between a torque command value T* and a phase command value α*.
Figure 4:
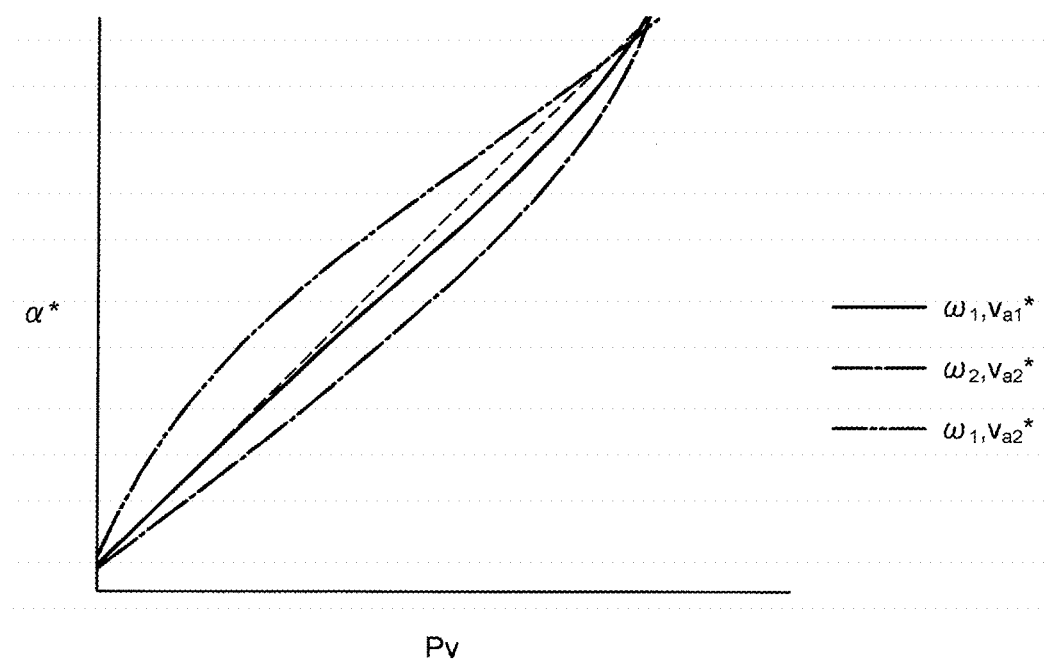
FIG. 4 is a view illustrating a correlation between a first signal Pv and the phase command value α*.

Here, with reference to FIGS. 3 and 4, the following describes a calculation method of the phase command value α* in the present embodiment.

FIG. 3 is a view illustrating a correlation between the torque command value T* and the phase command value α* in a general synchronous motor. FIG. 4 is a view illustrating a correlation between the first signal Pv and the phase command value α*. Note that, in these figures, a case where the rotation speed ω is $\omega_1$ and the amplitude command value $v_a^*$ is $v_{a1}^*$ is indicated by a continuous line, a case where the rotation speed ω is $\omega_2$ and the amplitude command value $v_a^*$ is $v_{a2}^*$ is indicated by a dot-dash line, and a case where the rotation speed ω is $\omega_1$ and the amplitude command value $v_a^*$ is $v_{a2}^*$ is indicated by a chain double-dashed line.

As illustrated in FIG. 3, the correlation between the torque command value T* and the phase command value α* varies depending on the amplitude command value $v_a^*$ and the rotation speed w. On this account, in a case where the phase command value α* is found only based on the torque command value T*, the phase generator 1 should store therein a correlation between the torque command value T* and the phase command value α* for each value of the amplitude command value $v_a^*$ and the rotation speed w.

As such, when three parameters (the torque command value T*, the amplitude command value $v_a^*$, and the rotation speed ω) are used for calculation of the phase command value α*, a processing load in the phase generator 1 is large. In view of this, in the present embodiment, the first signal Pv is used for calculation of the phase command value α*.

FIG. 4 is a view illustrating a correlation between the first signal Pv and the phase command value α* in a general synchronous motor. In this correlation, even if the amplitude command value $v_a^*$ and the rotation speed ω change, the correlation between the first signal Pv and the phase command value α* has very small variations. Accordingly, the phase command value α* can be expressed by use of a linear function taking the first signal Pv as a variable, as indicated by a broken line. In view of this, the phase generator 1 can accurately calculate the phase command value α* by use of the first signal Pv and the linear function indicated by the broken line in FIG. 4.

The following describes the correlation between the first signal Pv and the phase command value α*.

In the general synchronous motor, a steady relationship between a current i and a voltage v and a relationship between a current i and a torque T in the dq coordinate can be expressed by the following equations.

Math. 5

$$\begin{bmatrix} i_d \\ i_q \end{bmatrix} = \frac{1}{R^2 + \omega^2 L_d L_q} \begin{bmatrix} R & \omega L_q \\ -\omega L_d & R \end{bmatrix} \begin{bmatrix} v_d \\ v_q - \omega\phi \end{bmatrix} \quad (5)$$

Math. 6

$$T = \{\phi + (L_d - L_q)i_d\}i_q \quad (6)$$

Note that R indicates a winding resistance, φ indicates an interlinkage flux, $L_d$ indicates a d-axis inductance, and $L_q$ indicates a q-axis inductance.

Here, if it is assumed that $\omega L_d$ and $\omega L_q$ are sufficiently larger than R, Equation (5) can be approximated to the following equation.

Math. 7

$$\begin{bmatrix} i_d \\ i_q \end{bmatrix} \approx \begin{bmatrix} \frac{1}{L_d}\left(\frac{v_q}{\omega} - \phi\right) \\ \frac{1}{L_q}\frac{v_d}{\omega} \end{bmatrix} \quad (7)$$

The following equation is derived from Equation (6) and Equation (7).

Math. 8

$$\frac{\omega T}{v_a} \approx \frac{\Phi}{L_d}\sin\alpha - \frac{1}{2L_d}\left(1 - \frac{L_d}{L_q}\right)\frac{v_a}{\omega}\sin 2\alpha \quad (8)$$

In the right side of Equation (8), the first term is larger than the second term, so the second term can be omitted. On that account, Equation (8) is approximated to the following equation.

Math. 9

$$\frac{\omega T}{v_a} \approx \frac{\Phi}{L_d}\sin\alpha \quad (9)$$

Here, the left side of Equation (9) corresponds to Pv, so the following equation is derived from Equation (9).

Math. 10

$$\alpha \approx \frac{L_d}{\Phi}\sin^{-1} Pv \quad (10)$$

Here, the interlinkage flux φ and the d-axis inductance $L_d$ are determined by the configuration of the motor 200. Accordingly, it is found that the phase command value α* changes only in accordance with the first signal Pv. As such, the phase command value α* can be found only based on the first signal Pv, so that the phase command value α* can be found accurately while a load in the phase generator 1 is reduced.

Generally, a fluctuation width of the amplitude command value $v_a^*$ is narrower than a fluctuation width of the rotation speed ω, so the amplitude command value $v_a^*$ can be considered uniform. In view of this, a signal may be found by use of the torque command value T* and the rotation speed ω among parameters constituting the first signal Pv, and the phase command value α* may be calculated based on the signal. Meanwhile, in a case where the rotation speed ω does not change, a signal may be found by use of the torque command value T* and the amplitude command value $v_a^*$, and the phase command value α* may be calculated based on the signal.

With the second embodiment, it is possible to yield the following effects.

In the control method of the second embodiment, the first signal Pv calculated by the input signal converter 21 is a parameter proportional to the torque command value T* and the rotation speed ω of the motor 200 and inversely proportional to the amplitude command value $v_a^*$. As illustrated in FIG. 4, it can be considered that the phase command value α* changes not in accordance with the amplitude command value $v_a^*$ and the rotation speed ω, but only in accordance with the first signal Pv. On this account, a processing load can be made smaller in a case where the first signal Pv is calculated and the phase command value α* is calculated by use of the first signal Pv, than in a case where the phase command value α* is calculated by use of three parameters, i.e., the torque command value T*, the amplitude command value $v_a^*$, and the rotation speed ω. More specifically, a table based on experiment and analysis can be easily formed and further, a CPU resource (a data recording capacity and a computation load) can be reduced.

The control method of the second embodiment may be performed such that one of the amplitude command value $v_a^*$ and the rotation speed ω is assumed uniform, a signal is found based on the other one of them and the torque command value T*, and the phase command value α* may be found based on the signal. For example, in a case where a fluctuation width of the amplitude command value $v_a^*$ is small and considered uniform, a signal may be found based on the rotation speed ω and the torque command value T*, and the phase command value α* may be calculated based on the signal. With such a configuration, the processing load of the phase generator 1 can be further made small.

Third Embodiment

The second embodiment deals with an example in which the phase generator 1 calculates the phase command value α* by use of the first signal Pv. The third embodiment deals with an example in which the phase generator 1 calculates the phase command value α* by use of a second signal $ω_v$ in addition to the first signal.

Figure 5:
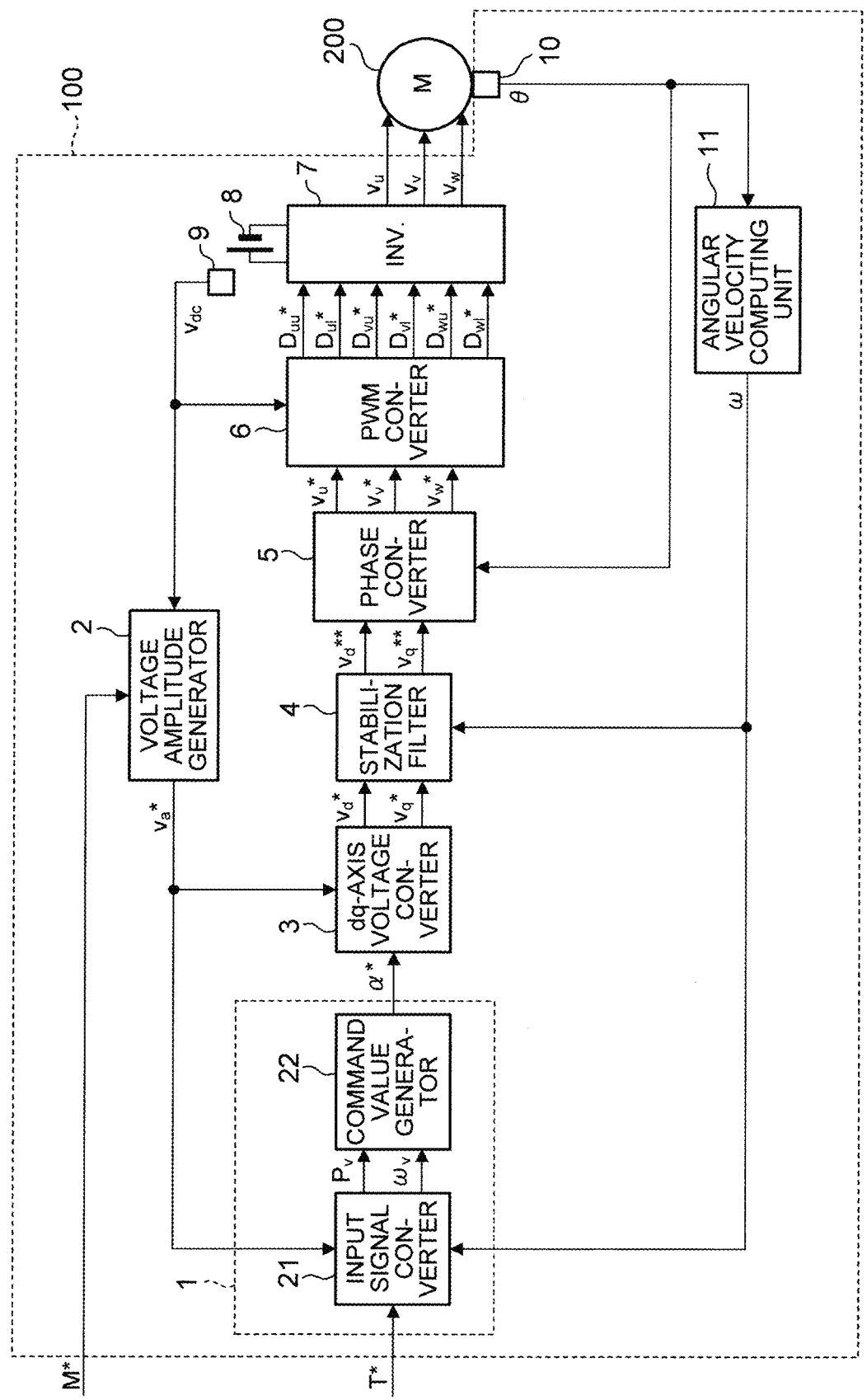
FIG. 5 is a block diagram of a motor control device in the third embodiment.

FIG. 5 is a schematic configuration diagram of a motor control device in the third embodiment.

The input signal converter 21 further calculates a second signal $ω_r$ based on the amplitude command value $v_a^*$ and the rotation speed ω by use of the following equation. The input signal converter 21 outputs the calculated second signal $ω_r$ to the command value generator 22.

Math. 11

$$\omega_v = \frac{\omega}{v_a^*} \quad (11)$$

Here, referring to Equation (8), the second term in the right side changes in accordance with an inverse of the second signal $ω_v$. That is, the second signal $ω_v$ contributes to the change of the phase command value α*. On this account, calculation accuracy of the phase command value α* can be improved by use of the second signal $ω_v$ in addition to the first signal Pv.

Note that the second signal $ω_r$ based on the amplitude command value $v_a^*$ and the rotation speed ω is used as the second signal, but the second signal is not limited to this. For example, in a case where the amplitude command value $v_a^*$ is assumed uniform, the rotation speed ω may be used as the second signal. Alternatively, in a case where the rotation speed ω is assumed uniform, the amplitude command value $v_a^*$ may be used as the second signal.

With the third embodiment, it is possible to yield the following effects.

In the control method of the third embodiment, the phase generator 1 calculates the phase command value α* by use of the second signal $ω_r$ proportional to the rotation speed ω and inversely proportional to the amplitude command value $v_a^*$, in addition to the first signal Pv. As shown in the second term in the right side in Equation (8), the second signal $ω_v$ contributes to the phase command value α*. On this account, the calculation accuracy of the phase command value α* can be further improved by use of the second signal $ω_v$.

Fourth Embodiment

The first to third embodiments deal with an example in which the phase generator 1 calculates the phase command value α* by a feedforward control. The fourth embodiment deals with an example in which the phase generator 1 performs a feedback control in addition to the feedforward control.

Figure 6:
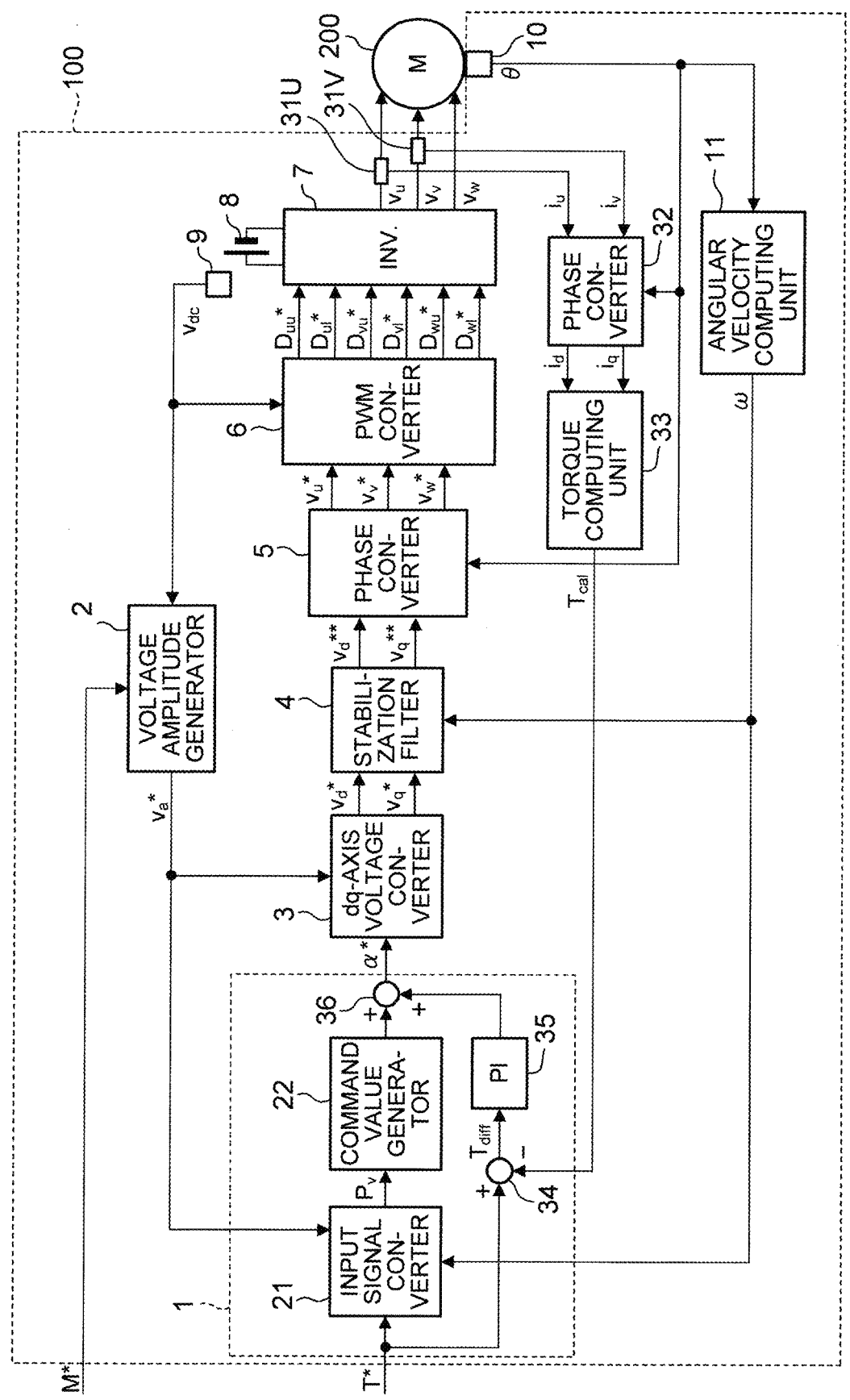
FIG. 6 is a block diagram of a motor control device in the fourth embodiment.

FIG. 6 is a block diagram of a motor control device in the fourth embodiment.

Since the motor 200 is driven by three-phase voltages, the inverter 7 and the motor 200 are connected to each other via three winding lines corresponding to three phases. A three-phase voltage $v_u$ is input into the motor 200 via a u-phase wiring line, a three-phase voltage $v_v$ is input therein via a v-phase wiring line, and a three-phase voltage $v_w$ is input therein via a w-phase wiring line. A current sensor 31u is provided in the u-phase wiring line and a current sensor 31v is provided in the v-phase wiring line. A u-phase current value $i_u$ detected by the current sensor 31u and a v-phase current value $i_v$ detected by the current sensor 31v are output to a phase converter 32.

The phase converter 32 performs coordinate conversion from the UVW phases to the dq axes by performing coordinate conversion shown in the following equation. Note that the sum of $i_u$, $i_v$, $i_w$ as three-phase currents is zero, so a w-phase current $i_w$ can be expressed as "$-i_u-i_v$."

Math. 12

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ -i_u-i_v \end{bmatrix} \quad (12)$$

As expressed in Equation (12), the phase converter 32 performs coordinate conversion on the u-phase current value $i_u$ and the v-phase current value $i_v$ based on a rotational phase θ that is an electric angle output from the rotation sensor 10, so as to calculate a d-axis current value $i_d$ and a q-axis current value $i_q$. The phase converter 32 outputs the d-axis current value $i_d$ and the q-axis current value $i_q$ to a torque computing unit 33.

The torque computing unit 33 stores therein a table illustrating a relationship of the current values of the d-axis and the q-axis with a torque in the motor 200. The torque computing unit 33 calculates an estimated torque $T_{cal}$ by use of the table based on the d-axis current value $i_d$ and the q-axis current value $i_q$. In other words, the estimated torque $T_{cal}$ is a torque corresponding to a current value of the motor 200.

The phase generator 1 includes a subtractor 34, a PI computing unit 35, and an adder 36 in addition to the input signal converter 21 and the command value generator 22.

The subtractor 34 subtracts the estimated torque $T_{cal}$ from the torque command value T*, and outputs a subtraction result to the PI computing unit 35 as a torque difference $T_{diff}$.

When the PI computing unit 35 receives the torque difference $T_{diff}$, the PI computing unit 35 performs PI-amplification computing and outputs a computing result to the adder 36. Note that a phase command value to be used for the feedback control is generated by the subtractor 34 and the PI computing unit 35.

The adder 36 adds up the phase command value generated by the command value generator 22 and the phase command value generated by the PI computing unit 35, and outputs an additional value to the dq-axis voltage converter 3 as a phase command value α*. Hereby, the phase generator 1 performs the feedback control in addition to the feedforward control.

With the fourth embodiment, it is possible to yield the following effects.

In the control method of the fourth embodiment, the phase generator 1 performs the feedback control by the subtractor 34 and the PI computing unit 35 in addition to the feedforward control.

More specifically, the torque computing unit 33 estimates an estimated torque $T_{cal}$ from a current flowing into the motor 200, and the subtractor 34 calculates a torque difference $T_{diff}$ that is a deviation between the torque command value T* and the estimated torque $T_{cal}$. The PI computing unit 35 calculates a phase command value so as to reduce the torque difference $T_{diff}$. The feedback control is performed as such. Here, in the presence of fluctuation or disturbance of a plant, a steady deviation may be generated in the torque of the motor 200. However, by performing the feedback control as such, the steady deviation in the motor 200 is reduced, thereby making it possible to stabilize a rotation control.

Fifth Embodiment

The first to fourth embodiments deal with an example in which the phase generator 1 calculates the phase command value α* by use of one or more signals constituted by the torque command value T*, the amplitude command value $v_a$*, and the rotation speed ω. The fifth embodiment describes configurations of the signals in detail.

In the second embodiment, the first term in the right side of Equation (8) is focused, and the phase command value α* is calculated by use of the first signal Pv proportional to the torque command value T*, proportional to the rotation speed w, and inversely proportional to the amplitude command value $v_a$*. As such, the signal output from the input signal converter 21 should be constituted by a combination that includes all of the torque command value T*, the amplitude command value $v_a$*, and the rotation speed ω.

The consideration to the combination of them leads to three groups as illustrated in Table 1.

TABLE 1

| A | $\omega T^*/v_a^*$ |
|---|---|
| B | $\omega T^*$, $T^*/v_a^*$, $\omega/v_a^*$ |
| C | $T^*$, $\omega$, $v_a^*$ |

Group A indicates a signal constituted in combination of all of the torque command value T*, the amplitude command value $v_a$*, and the rotation speed ω. Group A has one type of signal.

Group B indicates a signal constituted by any two of the torque command value T*, the amplitude command value $v_a$*, and the rotation speed ω. Group B has three types of signals.

Group C indicates a signal using any one of the torque command value T*, the amplitude command value $v_a$*, and the rotation speed ω as it is. Group C has three types of signals.

By selecting one or more signals from the signals in these groups, a signal used for calculation of the phase command value α* is determined. In order to find the phase command value α* accurately, the signal thus selected should include at least one of the torque command value T*, the amplitude command value $v_a$*, and the rotation speed ω. Table 2 illustrates selection of the signals.

TABLE 2

| (i) | SELECT ONE FROM A | <1> $\omega T^*/v_a^*$ |
|---|---|---|
| (ii) | SELECT ONE FROM A AND ONE FROM B | <2> $\omega T^*/v_a^*$, $\omega T^*$ |
| | | <3> $\omega T^*/v_a^*$, $T^*/v_a^*$ |
| | | <4> $\omega T^*/v_a^*$, $\omega/v_a^*$ |
| (iii) | SELECT ONE FROM A AND ONE FROM C | <5> $\omega T^*/v_a^*$, $T^*$ |
| | | <6> $\omega T^*/v_a^*$, $\omega$ |
| | | <7> $\omega T^*/v_a^*$, $1/v_a^*$ |
| (iv) | SELECT TWO FROM B | <8> $\omega T^*$, $T^*/v_a^*$ |
| | | <9> $\omega T^*$, $\omega/v_a^*$ |
| | | <10> $T^*/v_a^*$, $\omega/v_a^*$ |
| (v) | SELECT ONE FROM B AND ONE FROM C | <11> $\omega T^*$, $1/v_a^*$ |
| | | <12> $T^*/v_a^*$, $\omega$ |
| | | <13> $\omega/v_a^*$, $T^*$ |

When one signal is selected as illustrated in (i), "<1> $\omega T^*/v_a^*$" is selected from Group A so that the torque command value T*, the amplitude command value $v_a$*, and the rotation speed ω are all included. Note that the example using <1> is described in the second embodiment.

Cases where two signals are selected are illustrated in (ii) to (v).

A case where one signal is selected from Group A and one signal is selected from Group B is illustrated in (ii). In this case, three cases, i.e., "<02> $\omega T^*/v_a^*$, $\omega T^*$," "<03> $\omega T^*/v_a^*$, $T^*/v_a^*$," and "<04> $\omega T^*/v_a^*$, $\omega/v_a^*$" are considered.

A case where one signal is selected from Group A and one signal is selected from Group C is illustrated in (iii). In this case, three cases, i.e., "<05> $\omega T^*/v_a^*$, $T^*$," "<06> $\omega T^*/v_a^*$, ω," and "<07> $\omega T^*/v_a^*$, $1/v_a^*$" are considered.

A case where two signals are selected from Group B is illustrated in (iv). In this case, the selected signals should include at least one of the torque command value T*, the amplitude command value $v_a$*, and the rotation speed ω. On this account, three cases, i.e., "<08> $\omega T^*$, $T^*/v_a^*$," "<09> $\omega T^*$, $\omega/v_a^*$," and "<10> $T^*/v_a^*$, $\omega/v_a^*$" are considered. Note that the example using <09> is described in the third embodiment.

A case where one signal is selected from Group B and one signal is selected from Group C is illustrated in (v). In this case, three cases, i.e., "<11> $\omega T^*$, $1/v_a^*$," "<12> $T^*/v_a^*$, ω," and "<13> $\omega/v_a^*$, $T^*$" are considered.

Note that one signal is selected in <01>, and two signals are selected in <02> to <13>, but the present invention is not limited to this. Three signals may be selected so as to include at least one of the torque command value T*, the amplitude command value $v_a$*, and the rotation speed ω.

As such, by selecting a signal so as to include at least one of the torque command value T*, the amplitude command value $v_a$*, and the rotation speed ω, at least the first term is determined in the right side of Equation (8), so that the phase command value α* can be calculated accurately.

Here, the case of <11> will be described specifically.

Figure 7:
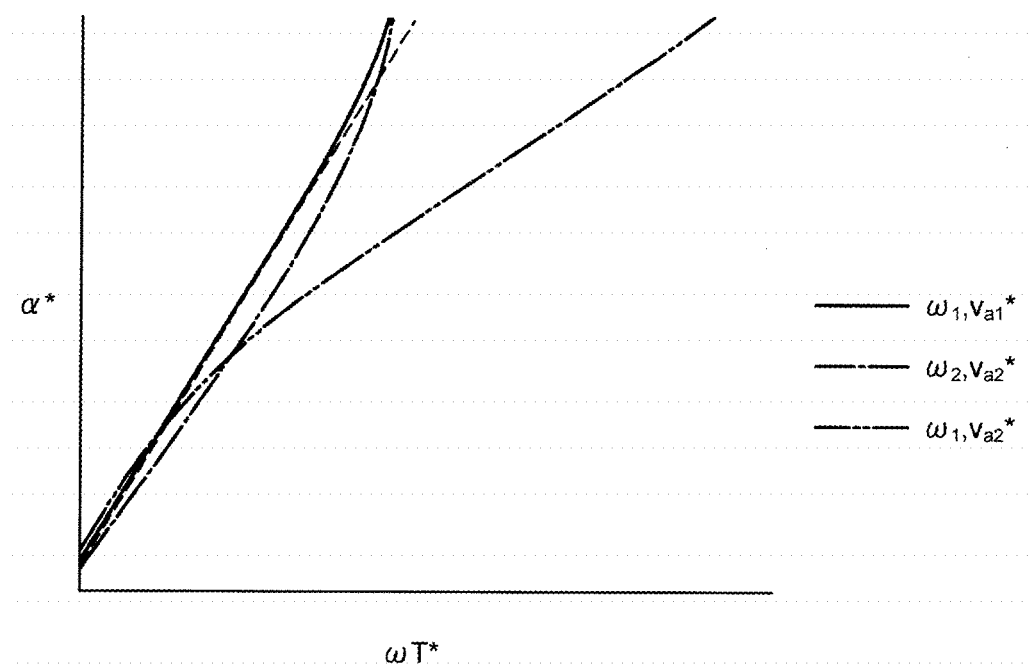
FIG. 7 is a view illustrating a correlation between a signal ωT* and the phase command value α*.

FIG. 7 is a view illustrating a correlation between ωT* and the phase command value α*.

With reference to the figure, "a case where the rotation speed ω is $\omega_1$ and the amplitude command value $v_a^*$ is $v_{a1}^*$" as indicated by a continuous line and "a case where the rotation speed ω is $\omega_2$ and the amplitude command value $v_a^*$ is $v_{a2}^*$" as indicated by a dot-dash line have generally the same slope. On this account, these cases can be approximated to a linear function that takes $\omega T^*$ as a variable, as indicated by a broken line. The slope of the linear function is different from the slope of "a case where the rotation speed ω is $\omega_1$ and the amplitude command value $v_a^*$ is $v_{a2}^*$" as indicated by a chain double-dashed line. Accordingly, it is found that the slope in the figure is determined depending on the amplitude command value $v_a^*$, namely $1/v_a^*$.

In view of this, when the correlation between $\omega T^*$ and the phase command value $\alpha^*$ is stored in association with $1/v_a^*$, $\alpha^*$ can be found with higher accuracy by use of two signals in <11>.

With the fifth embodiment, it is possible to yield the following effects.

In the fifth embodiment, when a signal input into the command value generator 22 is selected, signals are selected so as to include at least one of the torque command value $T^*$, the amplitude command value $v_a^*$, and the rotation speed ω. The signals thus selected include all elements originating from the phase command value $\alpha^*$, illustrated in the first term in the right side of Equation (8). Accordingly, it is possible to calculate the phase command value $\alpha^*$ with accuracy.

The embodiments of the present invention have been described above, but the embodiments exemplify some of application examples of the present invention and are not intended to limit the technical scope of the present invention to the specific configurations of the embodiments. Further, the embodiments can be combined as appropriate.

The invention claimed is:

1. A motor control method for controlling, by a voltage phase control, an applied voltage to be applied to a motor via an inverter, the motor control method comprising:
    calculating a phase command value to be used for the voltage phase control by a feedforward control based on a torque command value to the motor;
    calculating an amplitude command value to be used for the voltage phase control, based on a drive voltage for the inverter;
    calculating a voltage command value to the motor based on the phase command value and the amplitude command value; and
    applying the applied voltage from the inverter to the motor based on the voltage command value, wherein calculating the phase command value includes,
        generating a first signal proportional to the torque command value, proportional to a rotation speed of the motor, and inversely proportional to the amplitude command value, and
        calculating the phase command value by use of a function taking the first signal as a variable.

2. The motor control method according to claim 1, wherein
    calculating the phase command value includes,
        generating a second signal proportional to the rotation speed of the motor and inversely proportional to the amplitude command value, and
        calculating the phase command value based on the first signal and the second signal.

3. The motor control method according to claim 1, wherein
    calculating the phase command value includes calculating the phase command value by the feedforward control and a feedback control based on a difference between the torque command value and an estimated value of a torque of the motor.

4. A motor control device for controlling, by a voltage phase control, an applied voltage to be applied to a motor via an inverter, the motor control device comprising:
    a phase command value calculating module configured to calculate a phase command value to be used for the voltage phase control by a feedforward control based on a torque command value to the motor;
    an amplitude command value calculating module configured to calculate an amplitude command value to be used for the voltage phase control, based on a drive voltage for the inverter;
    a voltage command value calculating module configured to calculate a voltage command value to the motor based on the phase command value and the amplitude command value;
    a voltage application module configured to generate a driving signal to the inverter based on the voltage command value; and
    the inverter configured to operate in response to the driving signal so as to apply the applied voltage to the motor, wherein:
    the phase command value calculating module generates a first signal proportional to the torque command value, proportional to a rotation speed of the motor, and inversely proportional to the amplitude command value; and
    the phase command value calculating module calculates the phase command value by use of a function taking the first signal as a variable.

* * * * *